Figure 1:
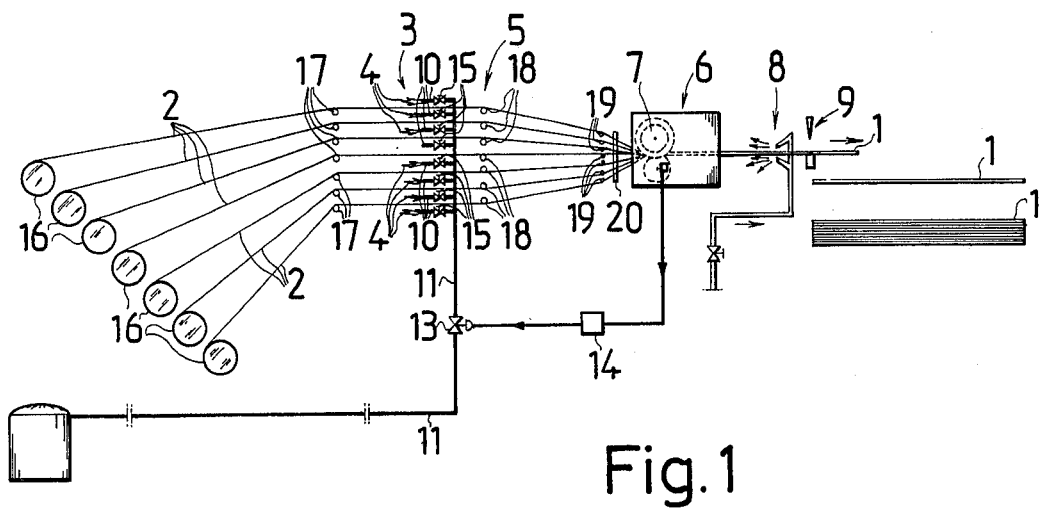

United States Patent [19]

Österman

[11] 4,430,144
[45] Feb. 7, 1984

[54] MEANS FOR MANUFACTURING SECTION MULTI-PLY CARDBOARD

[76] Inventor: Nils P. E. Österman, Köpbacka, 07900 Loviisa, Finland

[21] Appl. No.: 186,755

[22] Filed: Sep. 12, 1980

Related U.S. Application Data

[63] Continuation-in-part of Ser. No. 61,236, Jul. 26, 1979, abandoned.

[30] Foreign Application Priority Data

Dec. 9, 1978 [FI] Finland .................................. 782788

[51] Int. Cl.³ ............................................ B32B 35/00
[52] U.S. Cl. ..................................... 156/497; 156/82; 156/498; 156/499
[58] Field of Search .................. 156/82, 497, 498, 499, 156/199, 200, 201, 205, 206

[56] References Cited

U.S. PATENT DOCUMENTS

| | | | |
|---|---|---|---|
| 1,410,879 | 3/1922 | Bither | 156/206 |
| 3,042,508 | 7/1962 | Cudowici et al. | 156/499 |
| 3,823,047 | 7/1974 | Colombo | 156/498 |

FOREIGN PATENT DOCUMENTS

781436 3/1968 Canada .................................. 156/82

1256535 12/1961 France .................................. 156/497

*Primary Examiner*—Caleb Weston
*Attorney, Agent, or Firm*—Woodling, Krost & Rust

[57] ABSTRACT

The present invention relates to a means for manufacturing section multi-ply cardboard of narrow, less than 30 cm wide, thermoplastic-coated cardboard webs. The means comprises a heating means for heating cardboard webs which are conducted into the means with the aid of guides, substantially one above the other and mutually spaced, nozzles being disposed in the interstices of the webs to direct flames against the surfaces of the webs; a profilator with rolling members, into which the cardboard webs, heated of their surfaces, are conducted for pressing them together between the rolling members and for rolling to desired section or profile shape; and a cooling means for cooling the section or profile. Further the means may comprise a cooling means disposed in the direction of travel of the cardboard profile after the profilator for cooling the cardboard profile formed in the profilator, and a roll assembly disposed after the cooling means, the shape of its rolls substantially consistent with the shape of the cardboard profile profiled in the profilator for conducting said cardboard profile after the cooling means through the roll assembly.

3 Claims, 2 Drawing Figures

MEANS FOR MANUFACTURING SECTION MULTI-PLY CARDBOARD

This application is a continuation-in-part of Ser. No. 06/061,236 filed July 26, 1979, now abandoned.

The present invention concerns an apparatus for manufacturing section multi-ply cardboard.

Sections of multi-ply cardboard are used, for instance, as packing elements, with rectangular section as so-called angle boards. Such angle boards are made in the manner just described, using for raw material: cardboard, usually waste cardboard, for instance packaging residue, milk container, "Tetrapak" and equivalent cardboards. The basic requirement imposed on angle boards is rigidity. In the manufacturing of angle boards, rigidity is obtained by laminating a plurality of cardboard sheets one upon the other and shaping the multi-ply cardboard thus obtained to have the desired section. In connection with lamination, the thermoplastic-coated cardboard courses are heated until the thermoplastic material fuses, and they are thereafter pressed together and sectionally shaped, cooled and possibly cut to desired length.

The heating of the thermoplastic-coated cardboard webs to be laminated is nowadays usually accomplished by conducting the webs through an oven heated by means of electrical resistances. Such procedures are also known in which the cardboard web is heated by the aid of infra-red radiators, radiating surfaces, conventional heating resistances and equivalent means.

All the above-mentioned cardboard web warming and heating means have a common feature: a complicated and expensive construction. Moreover, their initial heating in connection with the starting of a manufacturing process and, similarly, their cooling in the event of a disturbance in the process or when the production is shut down take comparatively long, that is, the said warming and heating means, in particular those of greater weight and larger size, have a remarkable inertia. Furthermore, as a result of the slow response of the said warming and heating means, they often cause a risk of fire in connection with production breakdown when the cardboard webs stop and possibly jam in the said heating means.

Furthermore, cardboard web warming and heating means of prior art are not applicable when manufacturing, out of thermoplastic-coated narrow cardboard webs, multi-ply cardboard and in particular profiled multi-ply cardboard, by pressing together the coated and warmed cardboard webs and by profiling into desired shape the multi-ply cardboard thus obtained. This is due to the fact that the heated multi-ply cardboard profiles which have very recently been made by profiling narrow and rigid cardboard webs are stressed, that is they have internal stresses which tend to straighten out the desired profile which has been shaped in the profilator. Further, the heated cardboard webs coated with termoplastic material are slippery, whereby it becomes difficult to keep the cardboard webs one upon the other in connection with the profiling step. Such problems are particularly acute when aiming at high running speeds; then, the thermoplastic substance is still hot after the profilator, and the profiled multi-ply cardboard that has been formed will fall apart. The situation is highly problematic when profiling thick multi-ply cardboard brands and particularly such which contain thermoplastic in large amount. These problems are not encountered in the manufacturing of conventional, smooth multi-ply cardboards or other products out of thermoplastic-coated webs by pressing these after a heating process to become one single planar product. The problems cannot be solved with the aid of rolls that can be cooled.

Heating means for use in warming the surfaces of web-like, wide and thermoplastic-coated cardboard brands are not applicable in the surface heating of numerous thermoplastic-coated cardboard webs when such cardboard webs are being pressed to form multi-ply cardboard. This is because the heating means of prior art are too bulky for their disposal in the interstices of the numerous cardboard webs; at least one heating means—and usually two (one for each side of the web)—are required to heat each cardboard web, whereby e.g. for ten cardboard webs to be pressed together there are needed, in the worst case, actually almost twenty heating means, and this would imply an exceedingly large and impractical size of the apparatus.

The object of the present invention is to eliminate the drawbacks mentioned and to provide a novel means for the manufacturing of section multiply cardboard and which is free of the drawbacks mentioned.

A further object of the invention is: to provide a procedure and means suitable for use in the surface heating, in particular, of narrow cardboard webs having a width less than 30 cm, which means is simple of its structural design and inexpensive to procure. It is further an object of the invention: to provide a means for manufacturing multi-ply cardboard profiles so that the surface heating of the cardboard profiles can be started momentarily and likewise can be momentarily stopped in the event of a process disturbance for instance. It is further an object of the invention: to provide a means for manufacturing multi-ply cardboard profile and which causes no risk of fire in connection with breaks in production.

It is further an object of the invention: to provide a means for the manufacturing of multi-ply cardboard profile which is also appropriate for use in manufacturing narrow and rigid multi-ply cardboard profiles without tendency of the profile that has been formed to straighten out, and so that the multi-ply cardboard profile that has been formed retains the structure and shape which it has been given. It is especially an object: to provide a means suitable for use in fast production of narrow and rigid and of thick multi-ply cardboard profiles and by which one is enabled to manufacture any desired narrow and rigid multi-ply cardboard profile faster than before, without any detriment to its quality.

Regarding the circumstances which are characteristic of the invention, reference is made to the claims.

Thanks to the means of the invention, it becomes possible in a simple and fast way to heat the thermoplastic-coated cardboard webs to desired temperature, at which the plastic partly fuses, and the webs can be laminated by profiling together. The flame field, through which the webs are passed, can be generated momentaneously, for instance as the production is commenced; it is not necessary to store any heat in the heating means. It is furthermore possible to extinguish the flame field instantaneously in the event of a production break or of its discontinuation, whereby the cardboard webs cannot catch fire and therefore cause no fire hazard.

An important advantage is the simple construction of the cardboard web warming and heating means and the consequent low initial price. The price of the said warming means is only a fraction of that which a conventionally employed, equivalent electrical resistance oven commands. Moreover, the said warming means is reliable in service, its maintenance and servicing are simply performable, which means remarkably low opeerating costs.

A new feature in the present means is the warming and heating of the cardboard webs, preceding profiling, directly by the aid of a heating flame, the kind of which has not been practiced before. In practical operations, this procedure has proved, above all, to be low in initial and running costs, reliable in service, safe as regards fire hazard, and fast. By this procedure up to twice the running speeds are achieved which are possible in equivalent procedures of prior art.

In an important application, the means comprises a cooling means placed after the profilator, for cooling the freshly profiled and heated multi-ply cardboard profile, and a roll assembly disposed after the cooling means. The cooling means may consist e.g. of an air blower or, favourably, of a liquid bath, such as a water nozzle arranged to conduct cooling water into the channel bed of a multi-ply cardboard profile profiled to pesent the shape of a fluted channel opening upwardly. After the cooling means arranged in the form of a liquid bath, before or alternatively after the roll assembly, has been disposed with advantage a blowing means to remove the excess liquid from the surface of the cardboard profile and to cool the cardboard profile by the aid of said air blowing and of the evaporation of liquid attendant on the blowing. The said cooling means placed after the profilator, and the roll assembly, enable thick and/or much thermoplastic substance containing multi-ply cardboard profiles to be manufactured and produce a profiling result better than before; and what is most important of all: said ancillary apparatus enables the rate of production to be increased to a multiple compared with ancillary equipment of prior art.

Figure 2:
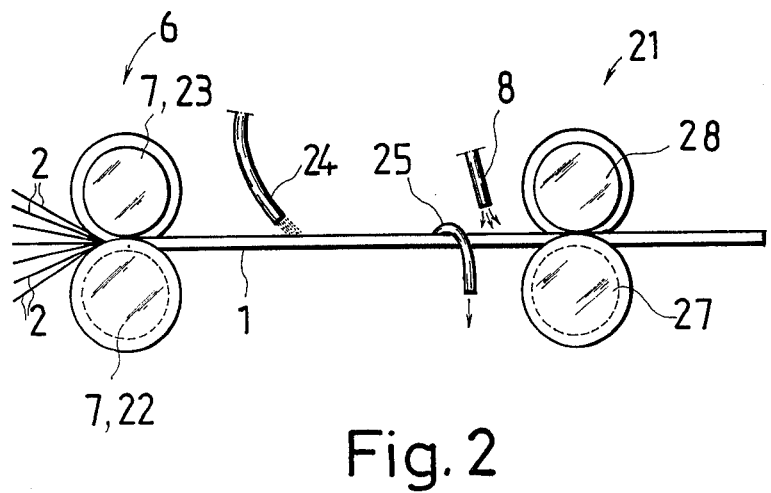

The invention shall be described in detail in the following with the aid of an embodiment example, with reference to the attached drawing, wherein:

FIG. 1 presents an apparatus according to the invention, in block diagram form, and FIG. 2 presents the profiling means belonging to the apparatus of another advantageous embodiment of the invention.

Referring now to FIG. 1, according to the procedure therein depicted, the multi-ply section cardboard 1 is produced from cardboard webs 2 coated with thermoplastic substance, these being warmed and heated by the aid of the heating means 5, the webs are pressed together in the profilator 6 with the aid of the rolling members 7 to become a multi-ply cardboard section, and cooled by the aid of the cooling means 8. Finally, the section goods is cut to desired lengths with the cross-cutting means 9.

As taught by the invention, the cardboard webs 2 are warmed and heated by passing them through a flame field 3. The flame field 3 is produced by the heating means 5, which comprises one or several fuel gas nozzles 10 with gas conductors 11, the gas nozzles having been arranged to point the flames towards the cardboard webs 2 conducted into the profilator 6, nozzles being disposed each in the interstices of the webs in the direction of the webs.

In the embodiment here presented, the cardboard webs 2 are conducted through the flame field 3 in the form of strips running one over the other, spaced from each other and substantially parallel. The flame field 3 is formed by directing the gas flames 4 produced by the fuel gas nozzles 10, in between the strips. The fuel gas is carried to the nozzles 10 from the gas main 11 through a regulating valve 15 provided in connection with each nozzle. Each flame 4, and thus the entire flame field 3, is adjustable to have the desired size, e.g. to have a length of 0-5-50 cm, this being done by the respective regulating valve 15. Furthermore, the supply of fuel gas to the valves 15 and nozzles 10 can be shut off and opened with the aid of an automatic valve 13 installed in the gas main 11 and which has been fitted with a monitor means 14 acted upon by the cardboard webs 2, or alternatively by the section multi-ply cardboard 1 so that in the event that the webs 2 and/or the section material 1 should stop, the member operating the monitor 14, such as the rolling member 7 of the profilator 6 for instance, connected to the monitor 14 will close the valve 13 and shut off the gas supply into the main 11 and thereby to the nozzles 10, thus extinguishing the flame field 3. If desired, the gas main 11 may be fitted with an emergency shut-off to enable the flane field to be put out in an emergency.

In the embodiment presented in FIG. 1, the passage of the cardboard webs 2 from the storage rolls 16 into the profilator 6 is guided by means of roll guides 17 placed before the flame field 3, by means of roll guides 18 after the flame field, by weight rolls 19, and by lateral guides 20. The guides 17, 18, and 19 guide the webs in their superimposed direction, that is at right angles to the surface of the web, while the guides 20 guide the webs laterally to enter between the press rolls 7. At least one of the press rolls is a driving one, i.e. provided with a motor rotating the roll.

The rolling members 7 belonging to the profilator, such as a double cone roll and its mating roll, have a shape varying in accordance with the desired sectional shape, and the rolling member may be consistent with e.g. a V, U, L or semicircular section or any section shape known in the art in itself.

The cooling means 8 may consist, for instance, of a cooling air blower as shown in FIG. 1, or of any cooling means known in itself. Furthermore, the cross-cutting means 9 may be, for instance, of the shear, saw or knife type, or any type of cross-cutting means known in itself in the art.

FIG. 2 shows the profilator 6 and the subsequent cooling apparatus 8 and roll assembly 21, which may be installed in a means of the type shown in FIG. 1. The profilator 6 comprises a lower grooved roll 22 and an upper edge roll 23, their axes parallel and at right angles to the direction of movement of the cardboard webs 2. The edge of the edge roll 23 enters, from above, the groove of the grooved roll 22. Following after the rolling means 7, edge roll 23 and groove roll 22, the apparatus comprises a liquid nozzle 24, which has been disposed to spray cold cooling water in the space between the rolling means into the groove, shaped like an upwardly opening channel, of the multi-ply cardboard profile formed of the cardboard webs 2. The cooling water is removed from the groove or channel of the cardboard profile with a draining means 25 disposed, spaced from the nozzle 24 in the direction of movement of the cardboard profile, and cooling and evaporating air is blown against the web through the air nozzle 26 immediately after the draining means 25 in the direction of travel of the cardboard profile. Furthermore, the apparatus comprises a roll assembly 21, comprising a lower grooved roll 27 and an upper edge roll 28, similarly disposed as the rolling members 7.

Thanks to the liquid bath cooler 24 and air blowing 26 following after the rolling members 7, the multi-ply cardboard profile formed with the aid of the rolling means is cooled and, as it passes through the rolls 27,28, potential deformations of the cardboard profile will be rectified and the profile obtains its ultimate shape.

The liquid bath cooling as taught by the present invention has not heretofore been applied in the manufacturinhg of multi-ply cardboard profiles, or of multi-ply cardboards on the whole. In the application here presented, the liquid bath cooling cools the cardboard profile that is being formed; in addition, the moisture which remains in the profile, as it evaporates due to the air blowing subsequent to the liquid cooling, causes additional cooling. Thanks to the liquid bath cooler, to the after-profiling (that is, the rolls 27 and 28), the apparatus is appropriate to be used in the manufacturing of exceedingly thick multi-ply cardboard profiles and/or cardboard profiles containing thermoplastic substance in large amount. Moreover, production speeds up to the four-fold in the best case are achieved with the apparatus, compared with an equivalent apparatus having no liquid bath cooling, air blowing and after-profiling.

It is possible, if desired, to the apparatus of the invention to attach all and any ancillary means known in themselves in the art, such as a printing means for applying printed information on the section multiply cardboard produced, or an apparatus for coating the cardboard webs 2 with thermoplastic substance (unless precoated cardboard webs are used) for instance with polyethylene, polyethylene wax ("hot melt"), polypropylene, or another equivalent thermoplastic substance.

The embodiment example is meant to illustrate the invention, without imposing any restrictions thereon.

I claim:

1. In an apparatus for manufacturing multi-ply material including means for heating webs of thermoplastic coated material having a direction of movement and means for bonding the heated webs with pressure rollers to create a multi-ply material, the improvement comprising the means for heating the webs of thermoplastic material being flames, said flames being directed substantially opposite the direction of movement of the webs of thermoplastic coated material substantially parallel to such webs in close proximity thereto to directly heat the webs, the means for bonding the heated webs with pressure rollers also creating longitudinal channels in the bonded multi-ply material and the addition of a cooling means, said cooling means including means to introduce a liquid into the longitudinal channels in the bonded multi-ply material, means to remove such liquid from the longitudinal channels and forced air means to remove the residue of such liquid from the longitudinal channels.

2. The improved apparatus of claim 1 characterized by the addition of a roll assembly means with rolls, said roll assembly means being located after said cooling means, and the shape of the rolls of said roll assembly means being substantially consistent with the shape of the longitudinal channel created by the pressure rollers, said roll assembly means confirming the shape of the longitudinal channel.

3. An apparatus for manufacturing multi-ply material of narrow thermoplastic coated webs comprising means for heating the webs, the means for moving the webs through the means for heating the webs with the webs one above the other and mutually spaced, said means for heating the webs having nozzles being disposed in the interstices of the webs in proximity thereto, said nozzles directing flames substantially opposite the direction of movement of the webs and substantially parallel to the webs, said flames directly heating the webs, means to shut off said flames in response to the cessation of motion of said webs, means for bonding and profiling the heated webs with pressure rollers to create a multi-ply material of desired profile shape, means for moving the webs from said means for heating the webs to said means for bonding and profiling the heated webs, said desired profile shape of the bonded and profiled material including an upwardly opening channel, a liquid nozzle for conducting water into said upwardly opening channel, a draining means for draining the cooling water from said upwardly opening channel, a cooling and evaporating air nozzle disposed to blow air into said upwardly opening channel, said liquid nozzle and said draining means being located between said cooling and evaporating air nozzle and said means for bonding and profiling the heated webs, means for moving the bonded multi-ply material past said liquid nozzle, said drawing means and said cooling and evaporating air nozzle, a rolling assembly means, said rolling assembly means being located after said cooling and evaporating air nozzle, said rolling assembly means having rollers substantially consistent with the profiled shape of the bonded and profiled multi-ply material created by said means for bonding and profiling the heated webs, and means for moving the bonded multi-ply material from said cooling and evaporating air nozzle to said rolling assembly means.

* * * * *